United States Patent Office 2,959,324
Patented Nov. 8, 1960

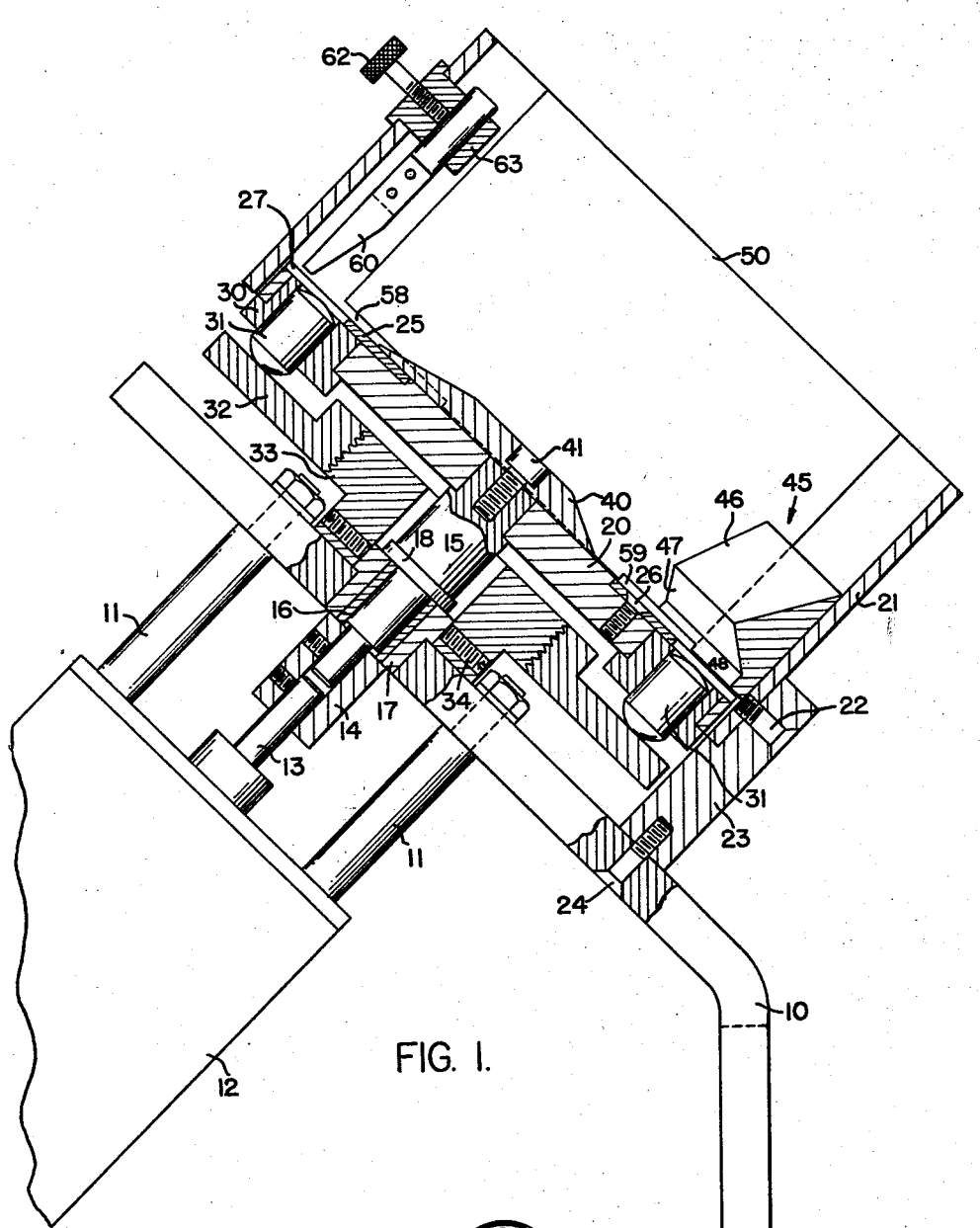
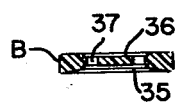
FIG. 6.
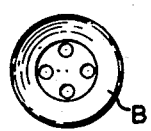
FIG. 7
FIG. 1.
INVENTORS
ROY H. HENDRICKSON AND
STANLEY A. SWEETING

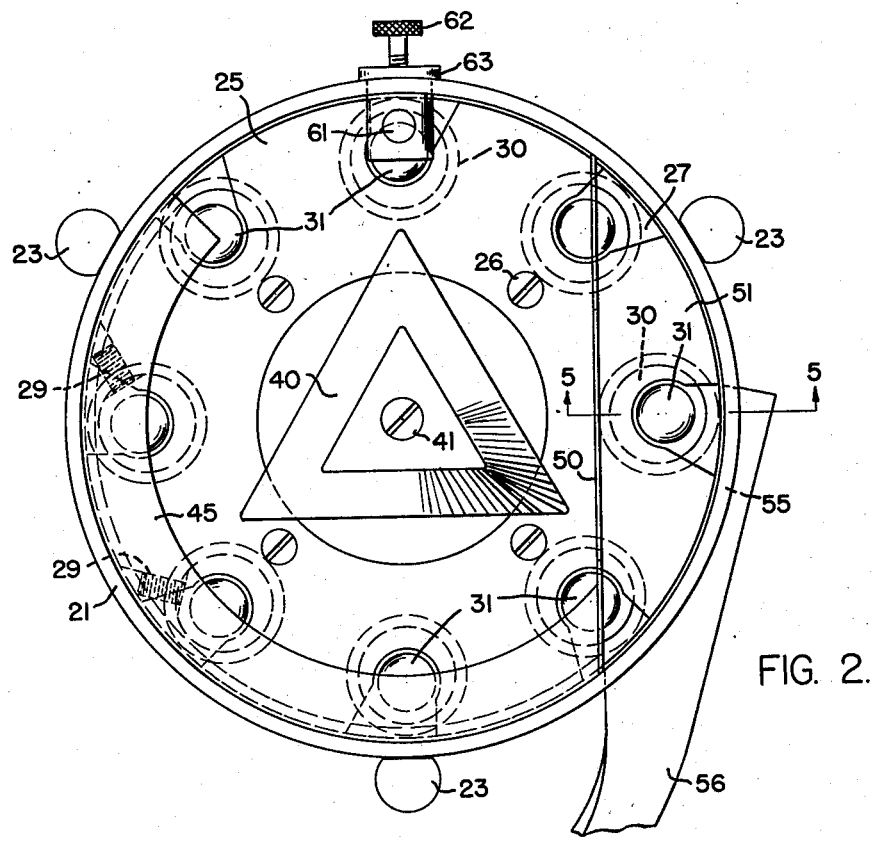
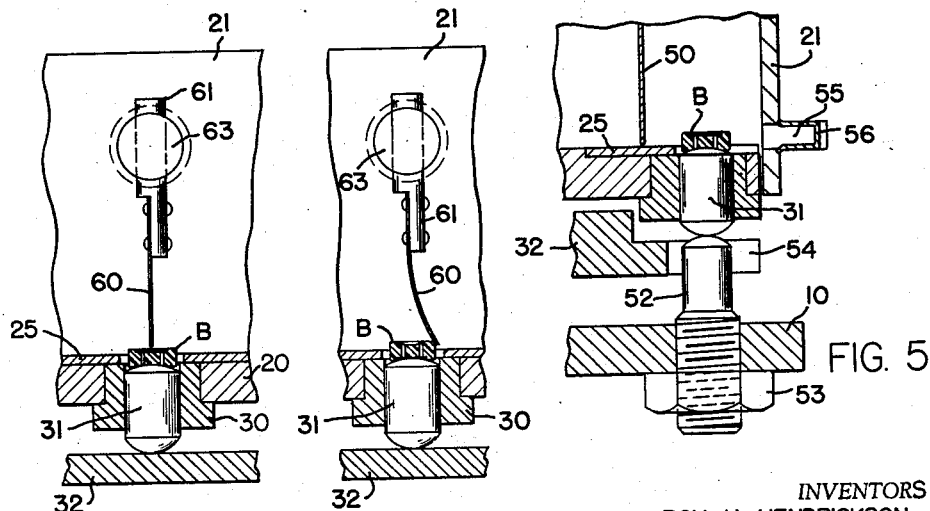
FIG. 2.
FIG. 3.  FIG. 4.  FIG. 5
INVENTORS
ROY H. HENDRICKSON AND
STANLEY A. SWEETING
BY
Attorney

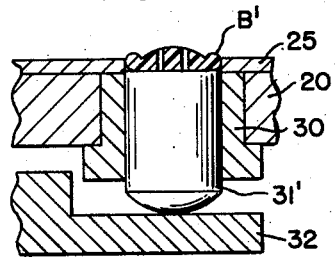 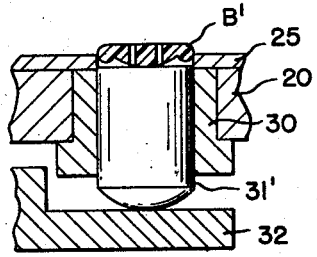 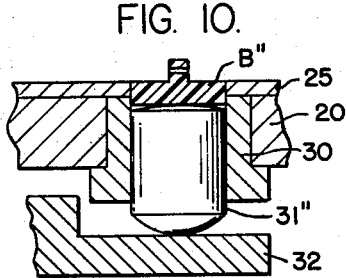 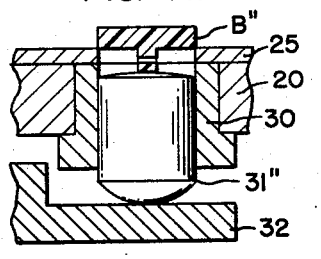 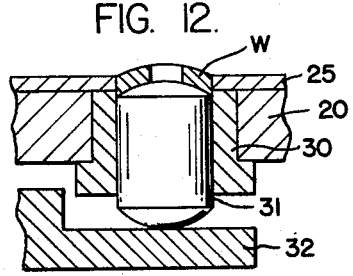 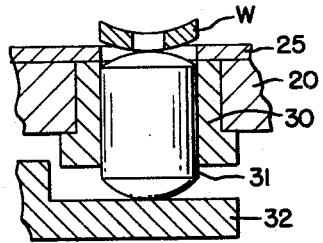 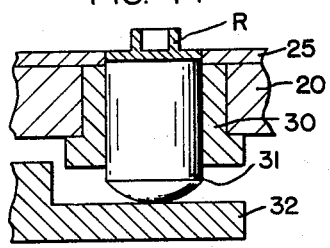 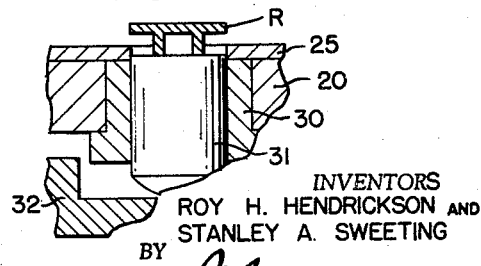

2,959,324
ORIENTER FOR ARTICLES IN A HOPPER

Roy H. Hendrickson and Stanley A. Sweeting, Rochester, N.Y., assignors to Rochester Button Company, Rochester, N.Y., a corporation of New York Filed Jan. 21, 1959, Ser. No. 788,212

3 Claims. (Cl. 221—168)

The present invention relates to orienters, and in one aspect to orienters for orienting buttons that are to be fed to a sewing machine.

Devices are known for orienting different objects in which a template is used to control the feed of the objects to a machine, or other device, and to permit their passage, or effect their rejection depending upon whether they are properly oriented when they reach the template. With template control mechanisms, however, a slight variation in the object, for instance, in thickness, from the standard for which the template has been made, will cause stoppage of the feed. Moreover, for each different shape of the object a different template has to be employed.

One purpose of the present invention is to provide an orienter for orienting objects, whose opposite side faces are dissimilar in shape, which will permit continued feed of the objects regardless of variation, for instance, in thickness of the objects.

Another purpose of the invention is to provide an orienter of the character described which will be simple in construction, easy to maintain in order, and which nevertheless will orient objects rapidly with complete accuracy.

Another purpose of the invention is to provide an orienter of the character described which can be changed quickly to take objects of a different size or shape.

Other purposes of the invention will be apparent hereinafter from the specification and from the recital of the appended claims particularly when taken in conjunction with the accompanying drawings.

In the drawings:

Fig. 1 is an axial sectional view of an orienter built according to one embodiment of this invention;

Fig. 2 is a plan view of this orienter;

Fig. 3 is a fragmentary view looking from the inside of the orienter at the flexible deflector for removing from the nest pins of the orienter objects which are not properly oriented thereon;

Fig. 4 is a corresponding view showing this deflector about to kick an improperly oriented object off of a nest pin;

Fig. 5 is a fragmentary section on the line 5—5 of Fig. 2 showing the means for directing properly oriented objects into the feed chute that conveys the objects to a machine or other apparatus for utilizing or further handling the objects;

Fig. 6 is an axial section on an enlarged scale of a typical button such as may be handled by the orienter illustrated;

Fig. 7 is a plan view of this button;

Fig. 8 is a fragmentary sectional view showing a different type button and a nest pin therefor, and showing this button properly nested on the nest pin;

Fig. 9 is a similar view but showing the button inverted and therefore not properly nested on the pin;

Fig. 10 is a similar view showing still another type of button and a nest pin therefor, and showing this type button properly oriented and nested on the pin;

Fig. 11 is a similar view but showing this other type button inverted and therefore not nested on the pin;

Fig. 12 is a similar view showing a properly oriented tubular rivet properly nested on the nest pin;

Fig. 13 is a similar view but showing the rivet inverted and therefore not nested;

Fig. 14 is a similar view showing a spring lock washer such as might be handled by the orienter and a nest pin made to handle this washer, the lock washer being shown properly oriented and nested on the nest pin; and Fig. 15 is a similar view but showing the lock washer inverted and therefore not properly nested on the nest pin.

In the following description reference will be made particularly to the orienting and feeding of buttons. It will readily be seen, however, that orienters made according to this invention may be used for orienting other objects as well as buttons; for instance, cupped washers, lock washers, rivets, etc.

The orienter shown comprises a rotary loading disc that is tilted with reference to the horizontal and that revolves inside a fixed cylinder or drum at the bottom of this cylinder or drum. The disc and drum together form a hopper adapted to hold the buttons or other objects which are to be oriented. These objects may be dumped into the hopper or continuously fed therein.

The rotary disc has a plate secured to its upper face which is provided at its periphery with a plurality of pockets spaced equiangularly about the axis of the disc and each of which is adapted to hold a button, or other object. Reciprocably mounted in the disc beneath each pocket is a pin whose upper surface is spherical to fit a spherical concavity in one side of the particular buttons, shown in Figs. 6 and 7, which are to be oriented.

Due to the tilt of the disc the buttons tend to gravitate to the lower side of the hopper; and as the disc revolves individual buttons are picked up by the pockets out of the mass of buttons in the lower portion of the hopper and are carried upwardly and then downwardly again. As the buttons are carried upwardly those buttons, which are right side up, nest in the pockets on the pins associated with the pockets, while those buttons, which are wrong side up, do not nest properly on the pins and will tend to slide out of the pockets by the action of gravity. A sweep or brush is provided on the drum to sweep these wrong-side-up buttons out of the pockets as the pockets rotate under the sweep or brush. The wrong-side-up buttons will project above the pockets far enough to be engaged by the sweep or brush; whereas the right-side-up buttons, which are nested down in the pockets, will pass under the brush or sweep without contacting the same.

As the pockets move downwardly, the properly oriented buttons will pass through a slot in a partition extending chordally across the lower part of the drum. This partition forms with the adjacent wall of the drum a discharge chamber for the buttons. Located beneath this chamber is a cam or pin; and as each nest pin rotates through the discharge chamber it rides up on this cam or pin and, if the nest pin has a button on it, it lifts this button out of the pocket so it can slide out through an opening in the outside wall of the discharge chamber into a chute which conveys the button to the sewing machine.

The downward tilt of the disc and the rotation of the disc will tend to agitate the buttons in the hopper to keep them dropping into the pockets of the disc. However, we preferably secure an agitator or slinger on top of the disc to augment the agitating action. The agitator or slinger shown is of truncated triangular shape.

To prevent buttons from standing on end an arcuate funneling segment is secured inside the wall of the drum.

This segment is shaped to tilt any standing buttons backward and to help guide them into the pockets.

Referring now to the drawings by numerals of reference, 10 denotes an angular bracket or plate, which may be adjustably fastened to a table or stand, and on which the hopper assembly of the orienter is mounted. The upper arm of this bracket is inclined, as shown in Fig. 1, at an angle of about 45° to the horizontal to secure the desired downward inclination of the loading disc. Secured to the bracket 10 by means of a plurality of posts 11 is a conventional geared drive motor 12. Coupled to the armature shaft 13 of this motor by a conventional coupling 14 is a shaft 15. This shaft is journaled in a bushing 16 in a sleeve 17 that has a press-fit in, or is otherwise fastened to the bracket 10. The shaft 15 is of reduced diameter at its lower end to fit into the coupling 14. It is formed with a collar 18 which seats against the upper faces of the bushing 16 and sleeve 17. Above the collar 18 it is of enlarged diameter, but adjacent its upper end it is slightly reduced in diameter again to form a shoulder against which the loading disc 20 seats. This disc may be held on the shaft 15 by a pressed-fit, or in any other suitable manner.

The disc 20 is positioned to rotate in a fixed, non-rotating cylinder or drum 21 which is fastened by means of screws 22 to three angularly-spaced posts 23 that in turn are secured by means of screws 24 to the bracket 10. The periphery of the disc 20 is close to, but has a slight clearance with reference to the drum.

The disc 20 has a plate 25 secured by screws 26 on its upper surface. This plate extends to the periphery of the disc, but has a plurality of equiangularly spaced notches or slots 27 formed in it, which are approximately of keyhole shape, as shown in Fig. 2, and which open onto the periphery of the plate. The notches 27 have sides which flare outwardly from one another toward the periphery of the plate 25 so as to permit buttons readily to slide out of the notches in the discharge chamber of the hopper.

Secured in the disc 20, as by set screws 29, or in any other suitable manner, are a plurality of bushings 30, which are equiangularly spaced, and which are equal in number to the number of slots 27, and which are positioned beneath these slots. Reciprocably mounted in the bore of each of the bushings 30 is a nest pin 31. The bores of the bushings are eccentric of the peripheries of the respective bushings for a purpose which will appear hereinafter. The pins 31 are intended to register with the cut-outs or slots in the plate 25. At their bottoms, these pins are adapted to rest upon and travel over the upper face of a flanged plate 32, which is threaded on and is adjustable axially upon a hub 33 that is releasably secured by means of set-screws 34 to the sleeve 17. Rotation of the hub by means, for instance, of a pin inserted in the recessed head of a setscrew 34 will cause plate 32 to be raised or lowered depending upon the direction in which the hub 33 is rotated.

A typical button B, such as may be handled by the orienter, is shown in Figs. 6 and 7. This button B has an upper face which has a spherical concavity 35 centrally disposed therein, and has a lower face which has a straight-sided cylindrical recess 36 therein. 37 are the holes for the thread by which the button is sewed to a garment.

The nest pins 31 for this particular shaped button are cylindrical for the major portions of their length but have spherical upper and lower surfaces. The spherical lower surfaces are for smooth running on the non-rotary plate 32. The spherical upper ends of the nest pins match approximately the concavity 35 in the tops of the buttons. Thus, between the top of each pin and the associated slot 27 in the plate 25, is a nest for a button.

Secured to the shaft 15 to rotate therewith is a truncated triangular agitator plate 40. This plate is fastened to the shaft 15 by a screw 41.

Mounted within the hopper at the lower side thereof and fastened to the inside of the drum 21 is a funneling segment 45. This segment extends approximately 180° around the inside of the drum. Its inside face is inclined downwardly, as denoted at 46 for the major part of the height of the segment, and then is undercut, as denoted at 47, and then has a lower cylindrical surface 48. Because of its shape, it prevents buttons, which are in the hopper, from standing on end; and it guides the buttons to the nests formed by the tops of the pins 31 and the grooves 27 in the plate 25.

Attached to the inside of the drum to extend chordally thereacross is a partition plate 50 which is fastened adjacent one end of the segment 45. This plate 50 forms with the adjacent portion of the drum a chamber which is the discharge chamber for the buttons.

Secured to the bracket 10 to be disposed approximately centrally of this chamber is a sstud 52 (Fig. 5) which is adjustably threaded through the bracket and which is held in adjusted position by nut 53. The upper end of this stud extends through a notch 54 in the plate 32. This pin 52 is so disposed as to lift each of the nest pins 31 vertically as each nest pin travels over the pin 52, thereby lifting any button B, which may be on top of the pin off of the pin so that it will slide by gravity through a slot 55 in the drum 21 into a chute 56 which will convey the buttons to the feeding mechanism of the sewing machine. This chute 56 is formed so that the buttons cannot turn over in it except under control of the chute, and, therefore, cannot become disoriented again.

The plate 50 has a slot 58 cut in it at its bottom at its entering end so as to permit properly oriented buttons to enter the discharge chamber; and it has a slot 59 in it at its other end so that any buttons, which may have gotten into the chamber, and which may not be discharged through the chute 56, can pass back into the main body of the orienter.

Mounted on the inside wall of the drum 21 is a flexible sweep or brush-off member 60 which is of flat spring metal, and which is riveted to a stud 61 that is secured by a set-screw 62 in nipple 63 which projects into the hopper. The sweep or brush-off 60 is positioned so that it will pass idly over any button B which is right-side up and therefore properly oriented on and nesting on a pin 31, as shown in Fig. 3, but will brush off of the pin any button B which is wrong-side up and therefore not properly oriented, as shown in Fig. 4.

In use, a plurality of buttons are loaded into the hopper. Due to the 45° inclination of the disc 20, these buttons will settle in the lower part of the hopper. When the motor 12 is started, the loading disc 20 rotates as well as the agitator 40 and the nest pins 31. The agitator swirls the buttons to the outer rim where the combination of the funneling segment 45 and the pick-up action of the cuts-outs 27 in the plate 25 cause the buttons to become nested correctly or incorrectly on the pins 31. A correctly nested button, which has its concavity 35 down, will climb the incline as the disc 20 rotates, and pass under the sweep 60 without touching the sweep, and will enter the discharge chamber 51. As the pin 31 carrying this button passes over the pin 52, it will be lifted, causing the button to be lifted clear of the nest, and causing the button to slide through the slot 55 in the drum into the discharge chute 56, by means of which it will be properly fed to the machine. An incorrectly nested button, which has its flat side down on the nesting pin, as shown in Fig. 4, will for the most part slide off the nest pins as they climb the incline. Occasionally one will adhere to a nest pin until it reaches the sweep. There, because the button is projecting high enough above the plate 25, the button will be knocked off the pin by the sweep and will fall back into the bottom of the hopper to be picked up by a nest pin.

Adjustment for various thicknesses of buttons can be made by rotating the hub 33. This adjusts the bottoming plate up or down, depending upon the direction of rotation of the hub. This adjustment can be made precisely by making the thread, which secures the plate 32 to the hub 33, a fine pitch thread. Adjustment for various diameters of buttons can be made by rotatably adjusting the eccentric bushings 30 in their respective openings in the disc 20. This will adjust the positions of the pins radially of the disc.

This orienter can be used for orienting various types of buttons, and is not restricted to orienting buttons of the type shown in Figs. 6 and 7. Thus buttons shaped as shown at B' in Figs. 8 and 9 can be oriented in the orienter merely by changing the nest pins of the orienter. For the buttons B' nest pins 31' can be used which have plane, instead of spherical, upper surfaces. A properly oriented button B' will nest with its plane bottom surface on the upper plane face of such a pin as shown in Fig. 8; whereas an improperly oriented button as shown in Fig. 9 will not nest in the pocket provided by pin 31' and plate 25 but will readily slide out of that pocket either by action of gravity or of the brush 60.

Figs. 10 and 11 show how the orienter may be used for orienting shank buttons by use of the pins 30 originally described which have sperical top surfaces, or by use of pins 32" which have a top surface with a flatter curve. The button B" in Fig. 10 is properly oriented and nested; the button B" in Fig. 11 is not. The button B" in Fig. 11 will readily drop, or be brushed, out of the pocket formed by the pin and plate 25.

Figs. 12 and 13 show how the orienter can be used for orienting spring lock washers. Here pins 31 or pins 31" can be used. In Fig. 12, the lock washer is properly oriented and nested; in Fig. 13 it is not.

Figs. 14 and 15 show how the orienter may be used for orienting tubular rivets R. Here pins 31' are used having plane top surfaces. Fig. 14 shows a rivet properly oriented and nested. Fig. 15 shows how an inverted, improperly oriented rivet will not be nested in the pocket but will project out of the pocket readily to slip, or be brushed, out of it.

While several different uses for and embodiments of the invention have been described, it will be obvious that the invention has various further modifications and uses. Thus, various shapes of agitating plates 40 may be employed, and various forms of plates 25 and 50. Moreover, instead of using a pin 52, a cam can be provided, to lift the nest pins 31 to effect discharge of the correctly oriented buttons into the chute 56. Furthermore, instead of using a plate 32 with a plane face on which the nest pins ride, the upper face of this plate might be provided with an arcuate cam path on which the pins can ride, this surface being shaped to have a dip in it followed by a rise, so that each nest pin can drop below the positions shown in Figs. 3 and 4 during the major portion of rotation of the plate, in order better to nest the objects and thereby increase the efficiency of pick-up of the objects. The rise is simply to lift the pins to lift the objects out of the pockets and is for the same purpose as pin 52.

Other changes can also be effected as will be clear to those skilled in the art. It will be understood, then, that this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. An orienter comprising a support, a hopper mounted thereon and comprising a wall member fixedly secured to said support and a disc mounted within said wall member adjacent the bottom thereof for rotation on an axis inclined to the vertical, said disc having a plurality of pockets in its upper face, a plurality of pins mounted in said disc for reciprocation in the direction of said axis, the several pins being disposed to form, respectively, the bottoms of the several pockets, and each pin being shaped at its upper end to interengage with one side face of the articles which are to be oriented, a partition fixedly secured within said wall member above said disc and forming with said wall member a discharge chamber, said partition having an opening therethrough which has a size and shape to permit passage of said articles therethrough, when properly oriented, as said articles are carried around in said pockets by said rotating disc, and camming means fixedly secured to said support beneath said chamber in a position for the pins to ride thereover as they rotate with the disc in the lower portion of their path of travel so that they will be lifted upwardly to lift out of the associated pocket any article nested therein.

2. An orienter comprising a support, a hopper mounted thereon and comprising a wall member fixedly secured to said support, and a disc mounted within said wall member adjacent the bottom thereof for rotation about an axis inclined to the vertical, said disc having a plurality of pockets in its upper face, a plurality of bushings mounted in said disc, a pin mounted eccentrically in each bushing to reciprocate in the direction of said axis, each of said bushings being rotatably adjustable in said disc about its axis to adjust the pin mounted therein radially of said axis, the several pins being disposed to form, respectively, the bottoms of the several pockets and each pin being shaped at its upper end to correspond to the shape of a portion, at least, of one side face of an article which is to be oriented, and camming means fixedly secured to said support to move each pin upwardly in its bushing as the pin moves in the lower portion of its path of travel with the disc, to lift out of the associated pocket any article nested therein.

3. An orienter as claimed in claim 2 wherein each pin is cylindrical and has a spherical upper face and a spherical lower face, and wherein there is a plate fixedly secured to said support beneath said disc and having a plane upper face inclined at right angles to said axis and on which the lower faces of said pins ride as said disc rotates.

References Cited in the file of this patent

UNITED STATES PATENTS

| 1,823,995 | Streby | Sept. 22, 1931 |
| 2,273,782 | Irwin | Feb. 17, 1942 |
| 2,853,176 | Kay et al. | Sept. 23, 1958 |

FOREIGN PATENTS

| 2,491,160 | Germany | Feb. 11, 1930 |